(12) United States Patent
Schulz et al.

(10) Patent No.: US 8,741,185 B2
(45) Date of Patent: Jun. 3, 2014

(54) COMPOSITE MATERIALS FOR WETTABLE CATHODES AND USE THEREOF FOR ALUMINUM PRODUCTION

(75) Inventors: Robert Schulz, Ste-Julie (CA); Sylvio Savoie, Ste-Julie (CA)

(73) Assignee: Hydro-Quebec, Montreal, Quebec (CA)

( * ) Notice: Subject to any disclaimer, the term of this patent is extended or adjusted under 35 U.S.C. 154(b) by 313 days.

(21) Appl. No.: 13/122,243

(22) PCT Filed: Sep. 29, 2009

(86) PCT No.: PCT/CA2009/001377
§ 371 (c)(1),
(2), (4) Date: Apr. 28, 2011

(87) PCT Pub. No.: WO2010/037220
PCT Pub. Date: Apr. 8, 2010

(65) Prior Publication Data
US 2011/0195228 A1 Aug. 11, 2011

(30) Foreign Application Priority Data
Oct. 2, 2008 (CA) .................................. 2640206

(51) Int. Cl.
H01B 1/04 (2006.01)
(52) U.S. Cl.
USPC .............................. 252/516; 75/229; 428/156
(58) Field of Classification Search
USPC .............................. 252/516; 428/156; 75/229
See application file for complete search history.

(56) References Cited

U.S. PATENT DOCUMENTS

| 4,774,052 A | 9/1988 | Nagle et al. |
| 5,059,490 A | 10/1991 | Brupbacher et al. |

(Continued)

FOREIGN PATENT DOCUMENTS

| EP | 911422 A3 | 6/1999 |
| FR | 2780318 A1 | 12/1999 |

(Continued)

OTHER PUBLICATIONS

International Preliminary Report on Patentability, completed Jul. 9, 2010 in corresponding International Application No. PCT/CA2009/001377 and the English Translation.

(Continued)

*Primary Examiner* — Khanh Tuan Nguyen
(74) *Attorney, Agent, or Firm* — Fish & Richardson P.C.

(57) ABSTRACT

The invention relates to a composite material of formula: $(C-N-B-MR)_x(Al-MR)_y(R)_z$ in which C—N—B-MR is one or more carbides, nitrides or borides of one or more refractory metals of group IV, V or VI of the Periodic Table and/or one or more aluminium carbides, nitrides or borides chosen from $Al_4C_3$, AlN, $AlB_2$ and $Al_{1-67}B_{22}$; Al-MR is one or more aluminides of one or more of the above refractory metals, it being understood that: if MR=Nb, Ta, Hf, Zr, Ti or V, then Al-MR=$Al_3$MR; if MR=W or Cr, then Al-MR=$Al_4$MR; if MR=Mo, then Al-MR=$Al_8Mo_3$ or $Al_{17}Mo_4$ (≅$Al_4$Mo), and R is a residual component other than carbon, comprising one or more phases chosen from $Al_4C_3$, AlN, $AlB_2$, $Al_{1-67}B_{22}$ and $MRtAlu(C-N-B)v$ in which t, u and v are numbers greater than or equal to zero, and x, y and z are the volume fractions of the respective components with x>y; x+y>0.5; x+y+z+1 and 0.01<y<0.5. The invention is also aimed at the use of this composite material as a coating in a component that can be welled by liquid aluminium and can be used in electrolysis cells.

14 Claims, 16 Drawing Sheets

(56) References Cited

U.S. PATENT DOCUMENTS 5,173,107 A * 12/1992 Dreyer et al. .................. 75/229
5,683,559 A    11/1997 de Nora
5,753,163 A     5/1998 Sekhar et al.
6,096,381 A     8/2000 Zheng

FOREIGN PATENT DOCUMENTS

WO    WO9607773  A1    3/1996
WO    WO9941429  A8   11/1999
WO    WO2005052218 A1  6/2005

OTHER PUBLICATIONS

Nanostructured Materials: Processing, Properties and Potential Applications. Edite par Kock Carl C., 2002 William Andrew Publishing/Noyes, pp. 57-58.

European Search Report mailed Apr. 5, 2012, which issued in corresponding EP Application No. EP098170140.

* cited by examiner

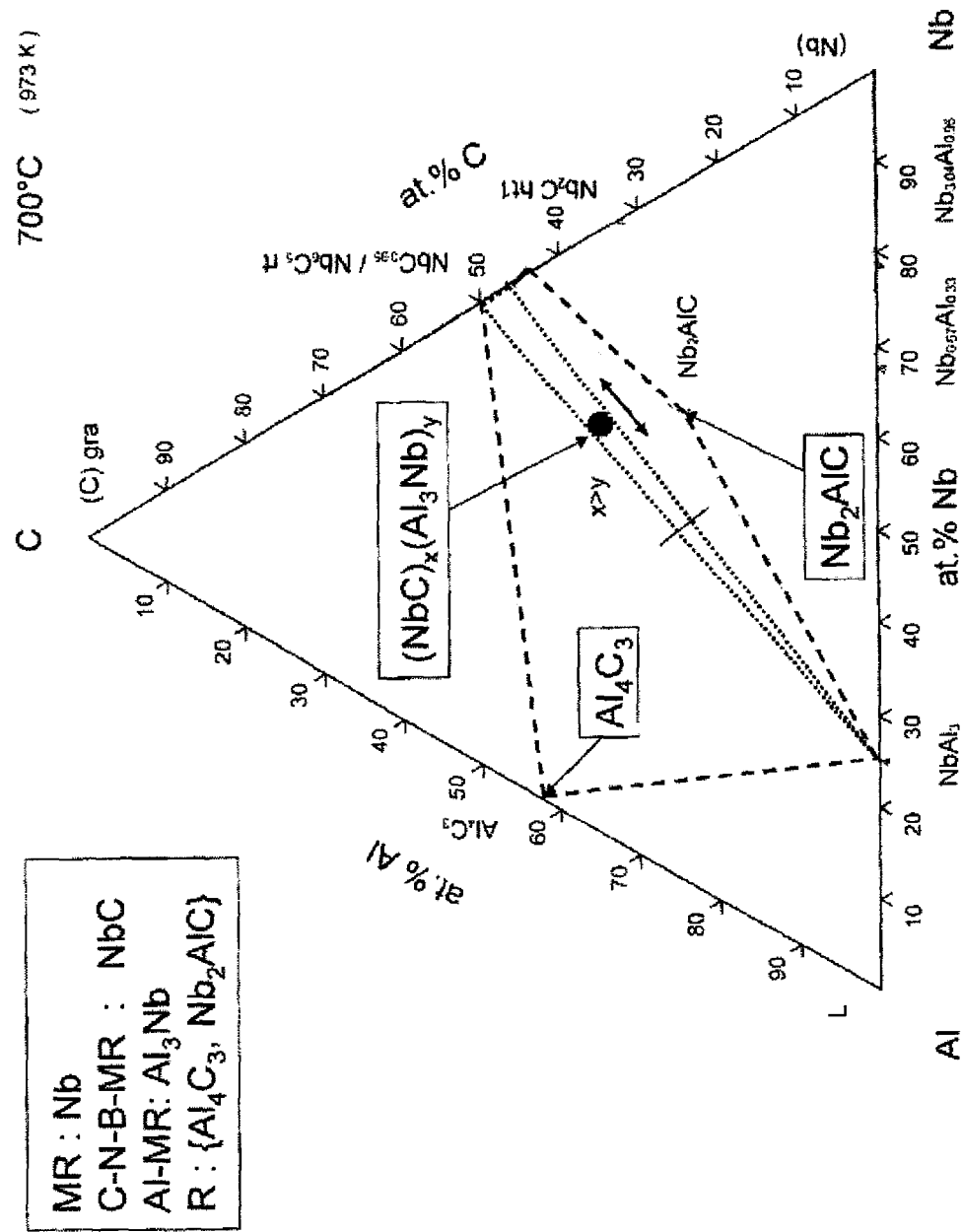

| MR | Al-MR | C-N-B-MR ||| |
|---|---|---|---|---|
| | | C-MR | N-MR | B-MR |
| Nb °C | NbAl₃ 1689 | NbC 3600 | NbN 2400 | NbB₂ 3050 |
| Ta °C | TaAl₃ 1570 | TaC 3950 | TaN 3093 | TaB₂ 3200 |
| W °C | WAl₄ 1316 | WC 2870 | | W₂B₅ 2600 |
| Ti °C | TiAl₃ 1345 | TiC 3067 | TiN 2950 | TiB₂ 2980 |
| Mo °C | Mo₃Al₈ 1565 | Mo₂C 2520 | | Mo₂B₅ 2100 |
| V °C | VAl₃ 1362 | VC 2830 | VN 2177 | VB₂ 2100 |

FIG. 6

COMPOSITE MATERIALS FOR WETTABLE CATHODES AND USE THEREOF FOR ALUMINUM PRODUCTION

CROSS REFERENCE TO PRIOR APPLICATIONS

This is a U.S. National Phase application under 35 U.S.C. §371 of International Patent Application No. PCT/CA2009/001377, filed Sep. 29, 2009, and claims the priority of Canadian Patent Application No. 2640206, filed Oct. 2, 2008 both of which are incorporated by reference herein. The International Application published in French on Apr. 8, 2010 as WO 2010/037220 under PCT Article 21(2).

FIELD OF THE INVENTION

The present invention relates to novel composite materials based on refractory metals. It also relates to components that are wettable by liquid aluminum and manufactured with the help of these novel materials as well as to a method for manufacturing coatings of these materials. Finally, it relates to the use of these components in electrolysis cells for aluminum production.

TECHNICAL BACKGROUND

Aluminum is produced conventionally by the Hall-Héroult process in electrolysis cells by reducing alumina dissolved in an electrolyte based on cryolite melted at temperatures of approximately 960° C. according to the following reaction:

$$Al_2O_3 + 3/2C \rightarrow 2Al + 3/2CO_2$$

The carbon of the anode is consumed during the reaction, and there is $CO_2$ release during aluminum production. The counter electrode or cathode also consists of carbon. Today, graphite blocks are used increasingly as cathode to have a better electrical conductivity and less energy loss in the process. The aluminum is deposited at the bottom of the cell, and it forms a conducting liquid aluminum layer on the surface of the cathodes. This aluminum can react with graphite to form aluminum carbide ($Al_4C_3$). This is one of the causes that limit the lifespan of cathodes (typically 3-8 years). Since liquid aluminum does not wet graphite, one usually maintains a relatively thick layer of liquid aluminum at the bottom of the cells (15-25 cm). However, the electromagnetic forces generated by the presence of strong electrical currents and magnetic fields create waves at the surface of this liquid aluminum layer, which can generate short circuits with the anode, if the anode-cathode distance (ACD) is insufficient. To prevent these short circuits, one maintains an ACD of relatively large value of approximately 4.5 cm. The relative displacement of the liquid aluminum layer with respect to the surface of the cathode is also a source of erosion and deterioration of the cathodes.

The resistance of the electrolyte in the gap between the anode and the conducting liquid aluminum layer produces a drop in voltage of approximately 1.5 V for an ACD of 4.5 cm and a typical current density of 0.7 A/cm$_2$. This ohmic drop constitutes the primary source of loss of energy in the process. This is the reason why, in the past decades, intense research has been conducted to develop cathode coatings that are wettable by liquid aluminum to reduce the thickness of the aluminum layer at the bottom of the cells, and thereby also allow a reduction in the anode-cathode distance. Besides being wettable, the coating must be a good electrical conductor, and allow improving the resistance to erosion of the cathodes, thus increasing their lifespans.

The open porosity at the surface of the cathodes, which represents typically 15-20% of the volume of the electrodes, is a source of deterioration, when aluminum and/or sodium originating from the electrolyte effectively penetrates into it and reacts chemically with the carbon. One research area thus consists in seeking products and methods to fill these pores so as to increase the lifespan of the electrodes. The example of the invention, described in the application mentioned below, is illustrative of this subject.

1—WO2000/046427 issued to Carbone Savoie and entitled "Impregnated Graphite Cathode for Electrolysis of Aluminium" describes a graphite cathode with, in its surface pores, a carbon-based product baked at a temperature of less than 1600° C., which makes it possible to increase the resistance to erosion of said cathode.

Moreover, since the electrolysis cells work at very high temperatures, research on protective coatings for cathodes that are wettable by liquid aluminum in the past focussed primarily on refractory materials (MR) or on composites based on refractory materials and carbon. In the context of this invention, a refractory material denotes a material having a very high melting point, typically higher than 1800° C. As far as the carbon is concerned, several types have been used, such as, coal, anthracite, coke, and graphite. The refractory material of first choice that is used most commonly is $TiB_2$ which has been known for many years for its wettability, good electrical conductivity, and its inertness in liquid aluminum.

The following list gives examples of inventions carried out for the purpose of developing methods and coatings to solve this problem:

2—WO1991/018845 in the name of Alcan International Ltd and entitled "Method of Producing Platelets of Borides of Refractory Metals" describes a method for producing platelets of borides of refractory metals as well as platelets so produced, which consists in reacting an oxide of refractory metals with boric oxide ($B_2O_3$) and carbon in the presence of a small quantity of alkali metals.

3—WO1993/020027 in the name of MOLTECH INVENT S.A., and entitled "Refractory Protective Coatings, Particularly for Electrolytic Cell Components" describes protective coatings formed by a self-maintained combustion of a colloidal pasty solution (colloidal slurry) containing refractory materials.

4—WO1994/020651 in the name of MOLTECH INVENT S.A. and entitled "The Bonding of Bodies of Refractory Hard Materials to Carboneous Supports" describes a method to glue tiles, plates or bricks made of refractory materials on a carbon-based cathode with the help of a colloidal non-reactive pasty solution comprising preformed particles of refractory materials, such as, $TiB_2$, in a colloidal solution containing fine alumina particles.

5—WO1994/021572 in the name of MOLTECH INVENT S.A. and entitled "Production of Carbon-Based Composite Materials as Component of Aluminium Production Cells" describes a method for manufacturing a composite material comprising a mixture of borides, carbides, oxides and/or nitrides of refractory metals and of aluminum, silicon, titanium or zirconium, which react to form a refractory compound. This mixture is combined with carbon and a colloidal binder containing fine particles, such as, $Al_2O_3$.

6—WO1997/006289 in the name of MOLTECH INVENT S.A. and entitled "Maintaining Protective Surfaces on Carbon Cathodes in Aluminium Electrowinning Cells" describes a cathode consisting of blocks of carbon having on the surface a layer which is wettable by liquid aluminum, and which contains particles of titanium boride or boride of other refractory metals, and a porous inorganic binder material containing liquid aluminum, whose content of refractory materials and boron is adjusted so as to prevent the dissolution of the wettable layer of boride of refractory metals.

7—WO1997/008114 in the name of MOLTECH INVENT S.A. and entitled "The Production of Bodies of Refractory Borides for use in Aluminium Electrowinning Cells" describes a method for manufacturing a part made of refractory borides chosen from the borides of Ti, Cr, V, Zr, Hf, Nb, Ta, Mo and Ce, and containing a colloid, such as, alumina or silica, the whole in the form of a pasty solution which is dried, and then treated thermally.

8—WO1998/017842 in the name of MOLTECH INVENT S.A. and entitled "Slurry and Method for Producing Refractory Boride Bodies and Coatings for use in Aluminium Electrowinning Cells" describes a part or a coating of refractory boride similar to the previous one, but in which the pasty solution can also contain an organic additive, such as, polyvinyl alcohol.

9—WO2000/029644 in the name of Alcan International Ltd. and entitled "Wettable and Erosion/Oxidation-Resistant Carbon-Composite Materials" describes a carbon-based composite material which can be used to manufacture blocks or coatings for the cathodes as well as a method for manufacturing a carbon-based composite material which produces in situ $TiB_2$ when exposed to liquid aluminum. The method consists in mixing quantities of $TiO_2$ and $B_2O_3$ to produce a precursor mixture, and then mix this product with a component that contains carbon.

10—WO2000/036187 in the name of Alcan International Ltd. and entitled "Multilayer Cathode Structure" describes a method for manufacturing one or more layers of a composite refractory material containing a metal boride on a carbon-based substrate (cathode) which consists in roughening the substrate before the application of the layers to improve their adhesion. When several layers are applied successively, the metal boride content increases progressively so as to minimize the differences between the thermal expansion coefficients of the various materials.

11—WO2001/042531 in the name of MOLTECH INVENT S.A. and entitled "Dense refractory material for use at high temperatures" describes a component or a coating of refractory material comprising particles of refractory materials containing boron, nitrogen, silicon, carbon or phosphorus, the whole in a matrix of oxides. The refractory material is obtained by subjecting a pasty solution (slurry) to a thermal treatment.

12—WO2001/061076 in the name of Alcan International Ltd. and entitled "A method for providing a protective coating for Carbonaceous Components of an Electrolysis Cell" describes a method for protecting a carbon-based electrolysis cell component from deterioration, which consists in preparing a solution of refractory materials in a "lignosulfonate" binder and applying it in the form of a protective coating which is then allowed to dry.

13—WO2001/061077 in the name of Alcan International Ltd. and entitled "Refractory coating for components of an aluminium electrolysis cell" describes a refractory coating for the components of an electrolysis cell manufactured by applying as a coating a pasty solution (aqueous slurry) comprising particles of a refractory material, such as, $TiB_2$ dispersed in an aluminum oxalate complex. When exposed to high temperatures in the electrolysis bath, the complex produces aluminum oxide which binds the refractory particles to each other as well as to the cathode.

14—WO2002/070783 in the name of MOLTECH INVENT S.A. and entitled "Aluminium-Wettable Porous Ceramic Material" describes a material comprising a ceramic that is resistant to liquid aluminum, such as, alumina, and a material wetted by aluminum comprising a metal oxide or a partially oxidized metal including Mn, Fe, Co, Ni, Cu or Zn which reacts or react with Al(l) to form a surface containing alumina, aluminum, and the metal derived from the metal oxide.

15—WO2003/018876 in the name of Alcoa Inc. and entitled "Method for Protecting Electrodes During Electrolysis Cell Start-up" describes a method to apply a protective layer to the cathode of an electrolysis cell comprising a plurality of layers preferably with an internal layer of $TiB_2$, and a protective layer which protects the cathode from the hot gases used to preheat the cell during startup.

16—WO2004/092449 in the name of MOLTECH INVENT S.A. and entitled "Aluminium-Wettable Carbon-based Body" describes a carbon component having an aluminum-wettable external component comprising a carbon rich mixture containing particles based on metals that can react with aluminum. The metal-based particles are metal oxides or partially oxidized metal particles chosen from Fe, Cu, Co, Ni, Zn and Mn.

17—WO2004/011697 in the name of Alcoa Inc. and entitled "Interlocking Wettable Ceramic Tiles" describes an electrolysis cell for aluminum comprising interlocking cathode tiles which are positioned on the graphite blocks. Each tile includes a main body with vertical holding notches to prevent displacement of the tiles out of the surfaces of the graphite blocks during operations.

18—WO2005/052218 in the name of Alcan International Ltd. and entitled "Stabilizers for Titanium Diboride-Containing Cathode Structure" describes a method for stabilizing the surface of the cathodes, which consists in preparing a mixture of materials based on carbon, $TiB_2$, and up to 25 wt % of a finely divided additive comprising two closely linked compounds of which one has a melting point greater than the annealing temperature of the mixture. One applies the mixture to the surface of the cathodes, and when it is placed in contact with the liquid aluminum, the aluminum reacts with the additive to form a dense phase at the surface, which has a low solubility in aluminum. Examples of additives are the $TiO_2/B_2O_3$ compounds or the $TiC/B_2O_3$ compounds.

The methods for manufacturing cathode coatings that are wettable by liquid aluminum include pressing and sintering techniques, when tiles made of dense refractory materials are glued or applied to the surface of graphite, or coating, painting and aerosol type atomization techniques followed by thermal annealing steps, when the refractory product is in the form of a paste or an aqueous or colloidal solution. On the other end, thermal deposition techniques have never been proposed, except insofar as the plasma technique (Air Plasma Spray—APS) is concerned, because, in cases involving the melting of ceramics or of refractory materials, very high temperatures of several thousand degrees Celsius are required (typically 2000-3500° C.). Only a plasma technique using ionized gases reaches these temperatures and energy levels. The invention below is an example thereof.

19—U.S. Pat. No. 3,856,650 in the name of Swiss Aluminium Ltd. in 1974 and entitled "Cathode for an Aluminium Fusion Electrolysis Cell and Method of Making the Same" describes a coating of a ceramic material which is electrically conductive and insoluble in cryolite and liquid aluminum, as well as a method for manufacturing the coating by plasma, which consists in applying the ceramic material in a finely dispersed form with an energy such that one produces a consolidated and adhering coating.

In spite of all the above-mentioned efforts, it appears that none of the inventions has become established on a large scale in industry to date, for the various reasons below:

a) Most of these inventions describe composite materials comprising carbon added in the form of anthracite, coke, graphite or other, and consequently these additives can also react with the liquid aluminum or the sodium of the electrolyte to form aluminum carbide, and lead to the deterioration of the coating.

b) Several of the coatings that have been the object of inventions become detached from the substrate during use, because of the difference in thermal expansion between the coating and the graphite cathode.

c) The inventions which consist in using dense tiles of refractory materials, such as, $TiB_2$, are difficult to apply on a large scale, because of the high costs of the materials and of the manufacturing methods.

d) Most of the patented coating materials are not thermodynamicaliy stable in liquid aluminum, and present a high physical and chemical erosion rate leading to an insufficient lifespan.

In parallel with these developments of protective coatings based on refractory materials that are wettable by liquid aluminum, one also notes a certain number of inventions concerning the "design" of an electrolysis cell, which take advantage of the use of protective coatings that are wettable by liquid aluminum. The patents below are corresponding examples.

20—U.S. Pat. No. 3,400,061 granted in 1968 in the name of Kaiser Aluminium & Chemical Corporation and entitled "Electrolytic Cell for Producing of Aluminium and Method of Making the Same" describes an electrolysis cell in which the conventional cathodic flat bottom made of carbon is replaced by a cathode structure which is drained, inclined, and wettable by aluminum. The drained cathode surface is coated with a refractory substance comprising a mixture of refractory metals and at least 5% carbon.

21—U.S. Pat. No. 5,203,971 granted in 1993 in the name of Moltech Invent S.A. and entitled "Composite Cell Bottom for Aluminium Electrowinning" describes an electrolysis cell whose base consists in part of conductive carbon sections and in part of mutually juxtaposed sections made of nonconductive refractory materials. The sections made of carbon are at the same level or at a lower level with respect to the sections made of refractory materials.

22—WO 1999/002764 granted in the name of MOLTECH INVENT S.A. and entitled "A Drained Cathode Cell for the Production of Aluminium" describes a drained cell in which the surface of the wettable cathode is dimensionally stable and inclined, thus allowing the liquid aluminum produced to flow off the surface. The distance between inclined anode and cathode (ACD) is not more than 3 cm.

23—WO 2002/097168 and WO 2002/097169 in the name of MOLTECH INVENT S.A., entitled "Aluminium Electrowinning Cells Having a Drained Cathode Bottom and an Aluminium Collection Reservoir," describe electrolysis cells for aluminum production comprising a cathode formed from a series of carbon blocks having a surface that is wettable by liquid aluminum.

One cannot end this section on prior art without mentioning the inventions that relate to channeling the aluminum produced to a collecting device. For this purpose, channels (grooves) are usually produced on the surface of the graphite cathodes, which serve not only to drain the liquid aluminum but also, in some cases, to break the waves on the surface of the surface of the liquid aluminum, as described previously. The following two inventions are corresponding examples.

24—WO1996/007773 in the name of MOLTECH INVENT S.A. and entitled "Aluminium Electrowinning Cell with Improved Carbon Cathode Block" describes a cathode consisting of graphite blocks whose surface has been scratched with a series of parallel channels (grooves) in the direction of the current bus bars to diminish the waves and the movements of the layer of liquid aluminum.

25—WO 2000/063463 in the name of MOLTECH INVENT S.A. and entitled "Aluminium Electrowinning Cell Having a V-Shaped Cathode Bottom" and WO2001/031088 entitled "Drained-Cathode Aluminium Electrowinning Cell with Improved Electrolyte Circulation" describe a cathode surface that is wettable by liquid aluminum, and drainable, containing channels (grooves) to collect the aluminum and having V-shaped sections with V-shaped surface to facilitate the flow of the aluminum.

The problem with these last inventions is that they add further costs to the technologies while making the methods more complex, since the wettable coatings are usually applied over the totality of a drainable cathode surface, which now presents relief and a complex geometry.

It is interesting to note that none of the numerous documents describing cathode coatings based on refractory materials that are wettable by liquid aluminum describes with precision the degree of wettability of the coatings in questions. Indeed, to characterize the wettability, these inventions usually limit themselves to applying the coating to a graphite specimen, often cylindrical in shape, and dipping this coated specimen in a bath of liquid aluminum. The analysis by microscopy of the interface between the coating and the aluminum after the solidification of the bath makes it possible to determine whether or not the liquid aluminum wetted the coating properly. However, the wettability of a surface by liquid aluminum is defined by the contact angle that forms when a drop of aluminum is deposited on this surface. A contact angle of less than 90° indicates a good wettability. None of the above-mentioned inventions specifies the degree of wettability of the patented coatings. However, it should be mentioned that the mechanisms that are at the origin of the wettability of the surfaces of refractory materials, such as, $TiB_2$, by liquid aluminum, have never been elucidated precisely.

In the context of the work that led to the present invention, the inventors noticed that there was a connection to be made between the cathode coating materials of electrolysis cells and grain refiners in the aluminum industry, two subjects that appear unrelated at first blush. Grain refiners are additives that one adds in small quantities to molten aluminum alloys to refine their microstructure during the solidification or, in other words, to reduce the size of the aluminum crystals. A fine and uniform microstructure improves the properties of the solidified metal and facilitates its subsequent shaping.

During the cooling, the surface of the grain refiner acts as a heterogeneous nucleation site to crystallize the alloy. To act effectively, the liquid aluminum thus must properly wet the surface of the grain refiner. Two types of grain refiner are available commercially. The Al—Ti—B system (example: Al-5Ti-1B in wt %), and the Al—Ti—C system (example: Al-3Ti-0.15C in wt %). The Al—Ti—B system which is best known consists of small particles of $TiB_2$ in a matrix of aluminum.

Now, recent work published in the literature (26-31):

26—P. Schumacher and A. L. Greer, Mater. Sci. Eng. A, A178 (1994) p. 309.

27—P. Schumacher and A. L. Greer, Mater. Sci. Eng. A, A181/182 (1994) p. 1335.

28—P. Schumacher and A. L. Greer, Proc. Conf. "Light metals 1995" (ed. J. W. Evans) p. 869 (1995), Warrendale, Pa., TMS.

29—P. Schumacher and A. L. Greer, Proc. Conf. "Light metals 1996" (ed. W. Hale) p. 745 (1996), Warrendale Pa., TMS.

30—P. Schumacher, A. l. Greer, J. Worth, P. V. Evans, M. A. Kearns, P. Fisher and A. H. Green, Mater. Sci. Technol., 14 (1998) p. 394.

31—A. M. Bunn, P. Schumacher, M. A. Kearns, C. B. Boothroyd, and A. L. Greer, Mat. Sci. Technol., 15 (1999) p. 1115 suggest that it may not be the surface of the $TiB_2$ as such which acts as nucleation site, but a fine layer of $Al_3Ti$ which is thought to be located between the surface of the $TiB_2$ and the aluminum. This thin layer of a Ti aluminide, which has a thickness of several nanometers, and which is responsible for the wettability, is thought to be stabilized by the presence of $TiB_2$ (see reference 29).

During the work that led to the present invention, the inventors, influenced by these recent studies on grain refiners, based themselves on the hypothesis that the presence of refractory metal aluminides is desirable, to ensure a good wettability of the cathode coatings.

Cassie's law, which describes the contact angle of a liquid on a composite material consisting of a refractory ceramic (carbide, nitride or boride) and of a refractory metal aluminide can be expressed as follows:

$$\cos \theta c = S_1 \cos \theta 1 + S_2 \cos \theta 2$$

where θc is the contact angle of the liquid with the composite material, θ1 and θ2 are the respective contact angles on the ceramic and the refractory aluminide, while $S_1$ and $S_2$ are the respective surfaces of the two phases in contact with the liquid. $S_1 = S_2 = 1$.

If the wettability on the refractory ceramic is not very high, and θ1 is approximately 90°, the first term of the above equation becomes negligible (cos θ1~0), and if the wettability on the aluminide is very high, and θ2 is close to 0 (cos θ2~1), then, under these conditions, the cosine of the contact angle on the composite becomes directly proportional to the surface area of the refractory metal aluminide. The larger the surface area will be, the smaller the contact angle on the composite will be. Consequently, for an aluminide surface fraction of 30%, the contact angle on the composite would be 72.5° or $\cos^{-1}(0.3)$. Along the same idea, if one imagines a composite consisting of grains of refractory ceramic (for example, grains of $NbB_2$ or NbC) with grain boundaries of refractory metal aluminide (for example, $Al_3Nb$), the greater the volume fraction and consequently the surface fraction of grain boundaries will be, the greater the wettability of the composite will be. Thus, it will be advantageous to reduce the size of the grains or of the crystallites, and to increase the grain boundary density, as is the case in nanocrystalline materials where the grain boundary density can reach values as high as 30%, when the size of the grains is on the order of few nanometers. By definition, a nanocrystalline material is a material for which the size of the grains or crystals is less than 100 nm.

SUMMARY OF THE INVENTION

The present invention relates to a composite with a majority component of carbide and/or nitride and/or boride of refractory metals or of aluminum (C—N—B-MR), as first object. It contains, by volume, at least 1%, but less than 50%, of aluminide of refractory metals (Al-MR), and less than 50% of a residual component (R) which stabilizes the composite. This composite is in the following formulation:

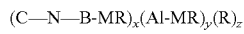

$(C—N—B-MR)_x(Al-MR)_y(R)_z$ in which:
Al, C, N and B represent aluminum, carbon, nitrogen, and boron, respectively;
MR is one or more refractory metals of the series IV, V or VI of the periodic table;
C—N—B-MR is one or more carbides, nitrides or borides of the above-mentioned refractory metal(s) and/or one or more aluminum carbides, nitrides or borides chosen from $Al_4C_3$, AlN, $AlB_2$ and $Al_{1-67}B_{22}$;
Al-MR is one or more aluminides of the above-mentioned refractory metal(s), it being understood that;
if MR=Nb, Ta, Hf, Zr, Ti, V then Al-MR=$Al_3MR$;
if MR=W, Cr then Al-MR=$Al_4MR$;
if MR=Mo, then Al-MR=$Al_8Mo_3$ or $Al_{17}Mo_4$ (~$Al_4Mo$)
R is a residual component other than carbon comprising one or more phases among $Al_4C_3$, AlN, $AlB_2$, $Al_{1-67}B_{22}$ and $MR_tAl_u(C—N—B)_v$ where t, u and v are numbers greater than or equal to zero, and
x, y, z are the volume fractions of the respective components with
x>y; x+y>0.5; x+y+z=1 and 0.01≦y<0.5,
with the reservation that, when C—N—B-MR=$TiB_2$, then Al-MR is not $Al_3Ti$.

The residual component is usual multiphased and it can contain aluminum carbide ($Al_4C_3$) if the composite contains carbides, and an excess of aluminum or carbon and/or aluminum nitride (AlN) if the composite contains nitrides, and an excess of aluminum or nitrogen and/or aluminum borides ($AlB_2$, $Al_{1-67}B_{22}$) if the composite contains borides and an excess of aluminum or boron. This residual component can also contain one or more mixed compounds of the type $MR_tAl_u(CN—B)_v$ if the composite contains carbides, nitrides or borides, and an excess of refractory metals MR. $Ta_2AlC$ (t=2, u=1, v=1) is an example of such a mixed compound (see FIG. 1b).

The composite of the invention presents great advantages in comparison to the materials of the prior art for applications in electrolysis cells for aluminum production. First, the carbides, nitrides and borides of the refractory metals (C—N—B-MR) in question are good electrical conductors compared to graphite. Moreover, even in the case where C—N—B-Mr is an aluminum carbide, nitride or boride ($Al_4C_3$, AlN, $AlB_2$, $Al_{1-67}B_{22}$), which is not an electrical conductor, the composite itself is thanks to its Al-MR component which is conductive. Indeed, all the aluminides of the refractory metals of the series IV, V and VI are good electrical conductors compared to graphite. Second, it has been discovered in the context of this invention that the wettability of the liquid aluminum on surfaces of aluminides of refractory metals is considerably superior to the wettability on carbides, nitrides or borides of refractory metals or of aluminum. Consequently, even if the carbide, nitride or boride (C—N—B-MR) is not wetted by liquid aluminum, the composite itself will be thanks to the refractory metal aluminide component (Al-MR). According to Cassie's law and following the same reasoning as described above, the contact angle on the composite would vary between 89° ($\cos^{-1}(0.01)$) and 60° ($\cos^{-1}(0.5)$), when the volume or surface fraction "y" of the aluminide component in the composite varies between 0.01 (1%) and 0.5 (50%). This calculation is based on the hypothesis of a contact angle of zero on the aluminide, and 90° on the refractory ceramic. Finally, the addition to the composite of an excess of aluminum and/or refractory metals via the "R" component then allows during exposure of the composite to temperatures close to the operating temperatures of the electrolysis cells (960° C.), to form in situ highly stable compounds ($Al_4C_3$, AlN, $AlB_2$, $Al_{1-67}B_{22}$, $MR_tAl_u(C—N—B)_v$), which improves the stability of the composite and its resistance to wear during prolonged exposures of the material in liquid aluminum at high temperature.

Some inventions, such as the one described in the application WO2005/052218 entitled "Stabilizers for Titanium Diboride-Containing Cathode Structure" have already described the addition of additives allowing the stabilization of cathode structures based on $TiB_2$ and carbon. These additives react with the liquid aluminum produced during the electrolysis reaction to form on the surface a dense phase which seals the open porosity and stabilizes the surface of the coating. However, this stabilization of the material works only on the surface, whereas in our case, the entire volume of the composite is stabilized, since the R component is inside the composite.

The invention as claimed also concerns, as second object, a method for manufacturing a coating made from a composite as defined above, which consists in consolidating the material by partial melting or by sintering at a temperature of less than 1800° C., or in projecting at high speed fine particles of the composite on a substrate using the thermal spray technique HVOF.

The invention as claimed also concerns, as third object, a component that is wettable by liquid aluminum, which consists of a solid body to which a coating made of a composite as defined above is applied, but without the reservation expressed above at the end of the definition of the formulation of the composite.

Finally, the invention concerns the use of a component, as defined above, in electrolysis cells for aluminum production.

The invention will be understood better following a reading of the detailed but nonlimiting description of the invention, which is provided below in reference to the drawings in the appendix.

BRIEF DESCRIPTION OF THE DRAWINGS

FIGS. 1a-1d present the ternary phase diagrams of the systems Nb—Al—C, Ta—Al—C, W—Al—C, and Ti—Al—C, respectively. The two-phase triangles surrounded by dotted lines encompass the compounds of the type $(C-N-B-MR)_x(Al-MR)_y$. The three-phase regions inside the broken lines encompass the compounds of type $(C-N-B-MR)_x(Al-MR)_y(R)_z$.

FIG. 6 presents a table indicating the melting points of various refractory metal aluminides as well as of various refractory ceramics.

DETAILED DESCRIPTION OF THE INVENTION

As indicated above, FIGS. 1a, 1b, 1c and 1d represent phase diagrams at high temperature (close to that used in the electrolysis cells) of the ternary systems Nb—Al—C, Ta—Al—C, W—Al—C, and Ti—Al—C, respectively. The composites $(C-N-B-MR)_x(Al-MR)_y$ without residual component ($z=0$), are located inside the triangles surrounded by dotted lines.

Moreover, the space delimited by broken lines indicates compositions according to the invention with residual components presenting an excess of refractory material, on the one hand, or of aluminum and carbon, on the other hand ($z \neq 0$).

Figure 1B:
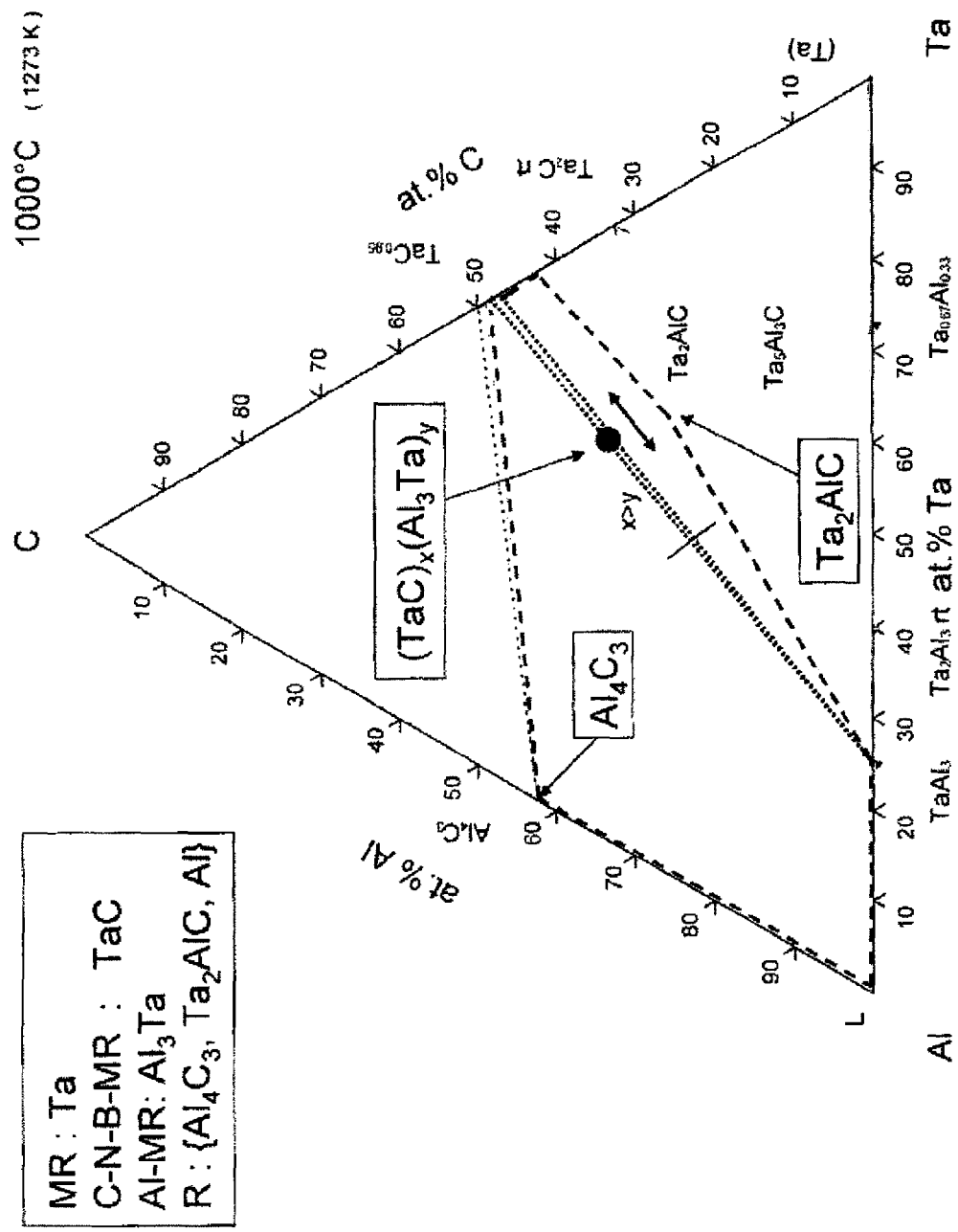
Figure 1C:
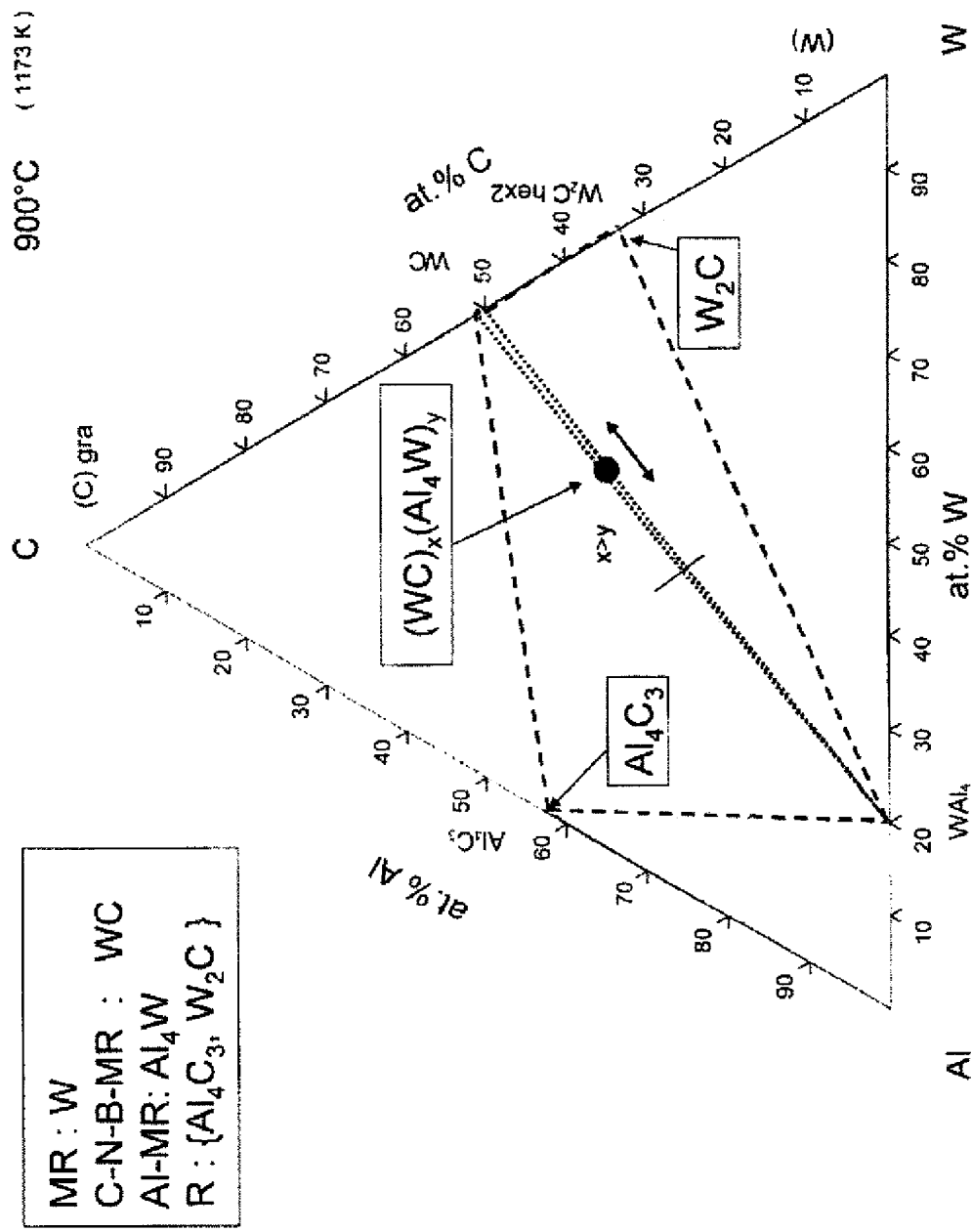
Figure 1D:
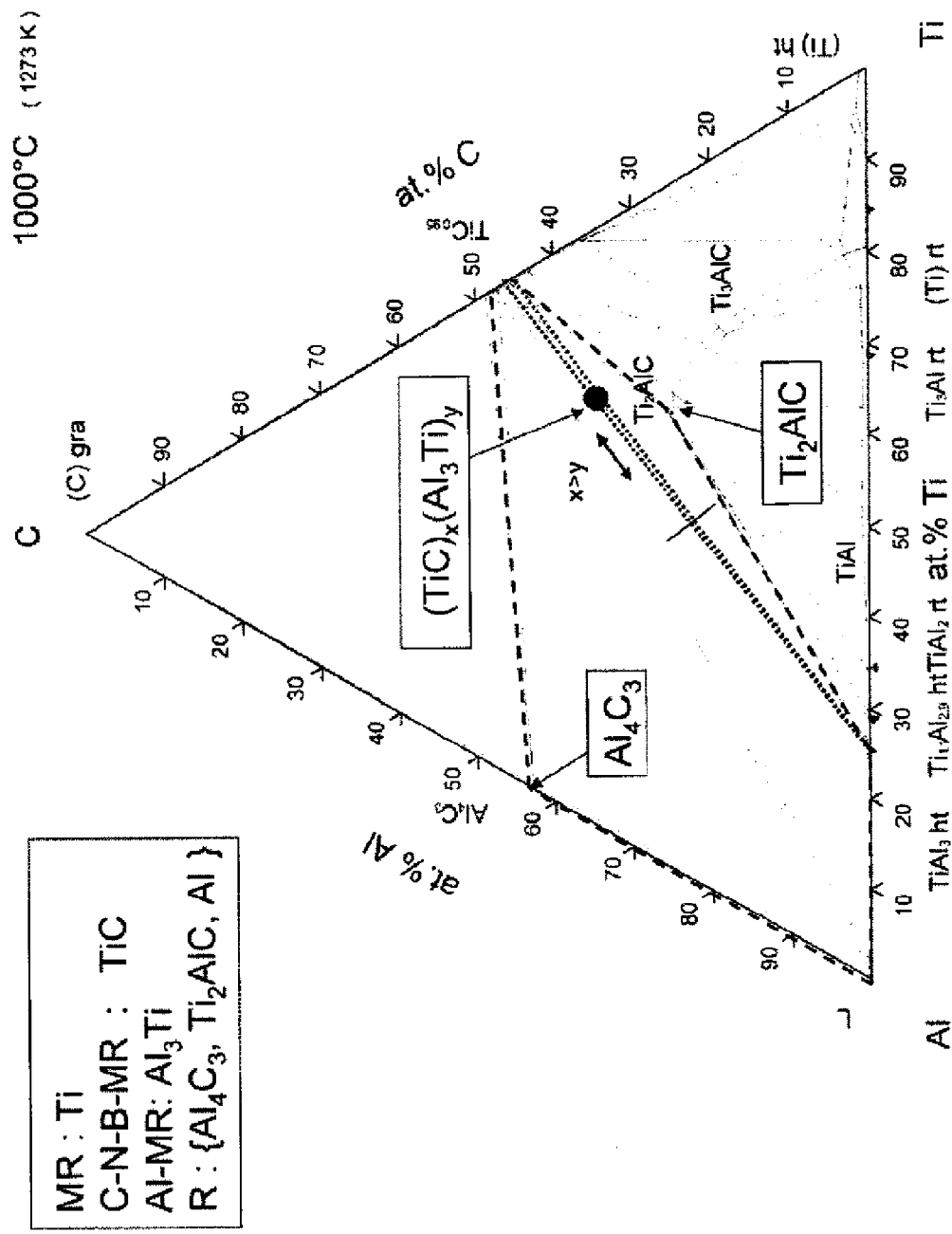
Figure 2A:
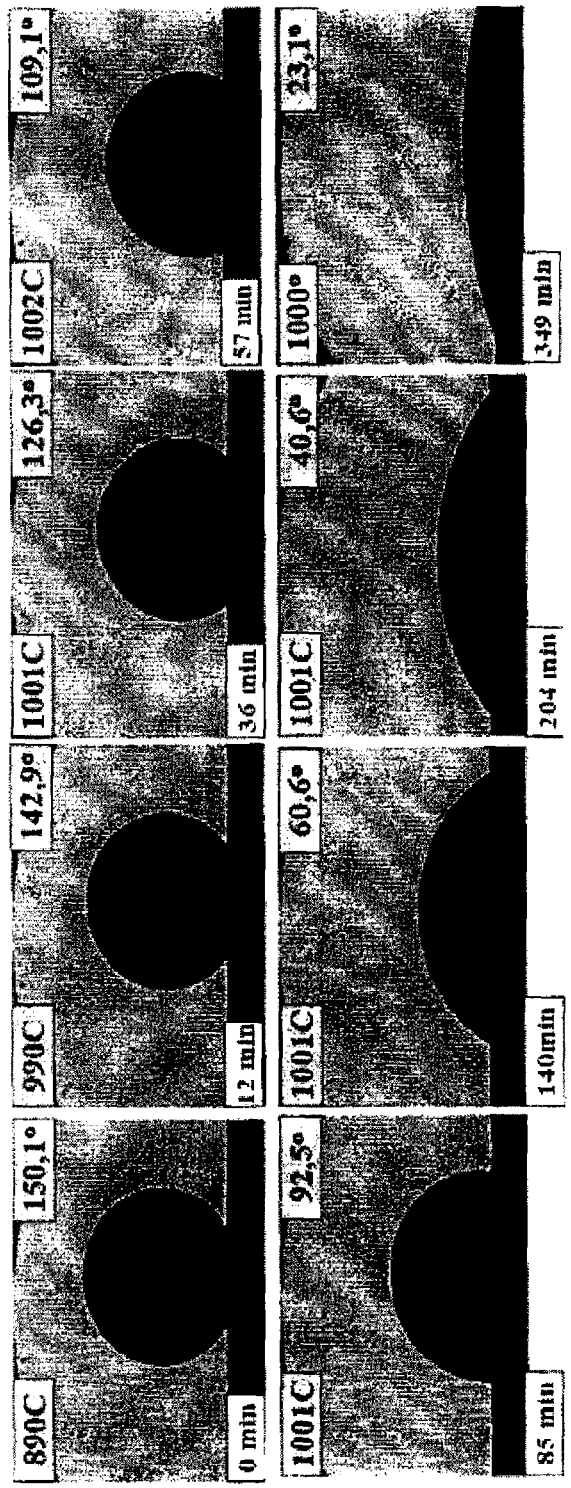
FIGS. 2a and 2b present, at a temperature of approximately 1000° C., the wettability as a function of time of a drop of liquid aluminum of 90 mg on a dense substrate of TiC and $TiB_2$, respectively. The table under the figures indicates the contact angles on the left, on the right as well as the mean value.
Figure 2B:
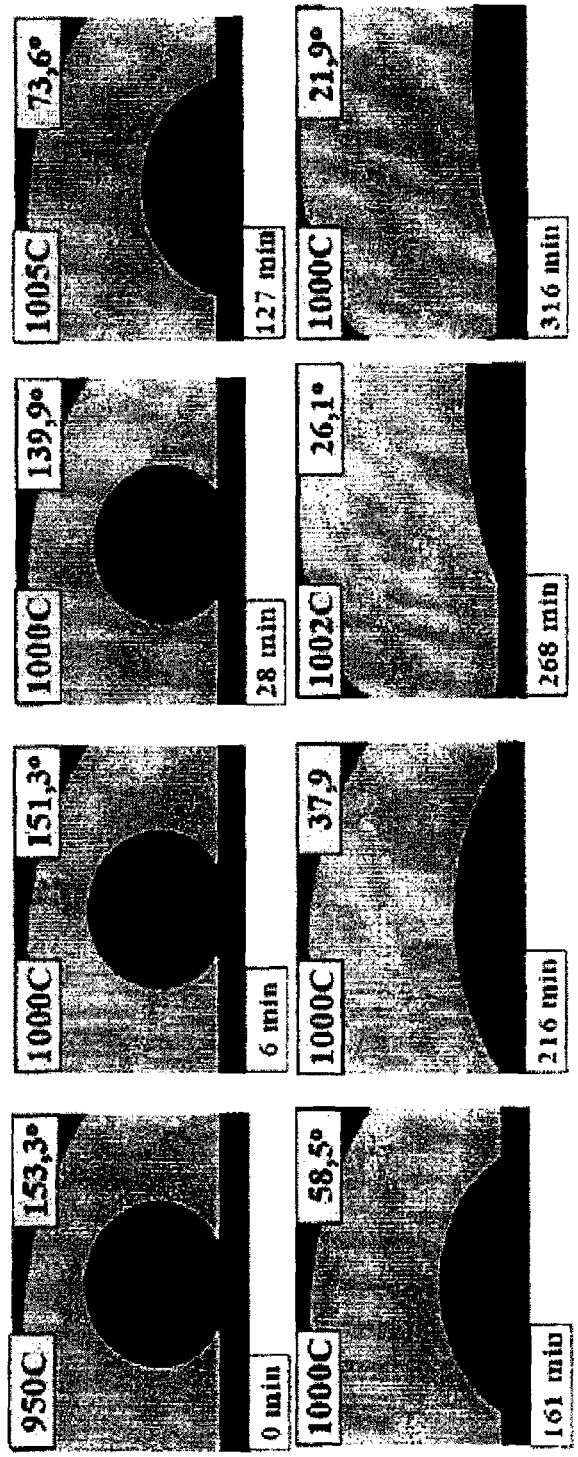

FIGS. 2a and 2b represent experiments of wettability of liquid aluminum on surfaces of components (C—N—B-MR), that is, of refractory ceramics where MR is Ti. It should be noted that, although the melting point of pure Ti is slightly under 1800° C., it is nevertheless considered a refractory metal (MR) in the present context. FIG. 2a is the case of TiC, while FIG. 2b is the case of $TiB_2$. In these photographs, one observes a drop of liquid aluminum which wets the surface as a function of time. The temperature, the time, and the mean contact angle with the surface of TiC or $TiB_2$ are indicated on each image. The table under each figure summarizes the results of the experiment. One notes that durations in excess of 300 min are required to achieve a mean contact angle on the order of approximately twenty degrees. These refractory materials which are wetted by liquid aluminum (contact angle less than 90°) are known to be good grain refiners (see the previous discussion).

Figure 3A:
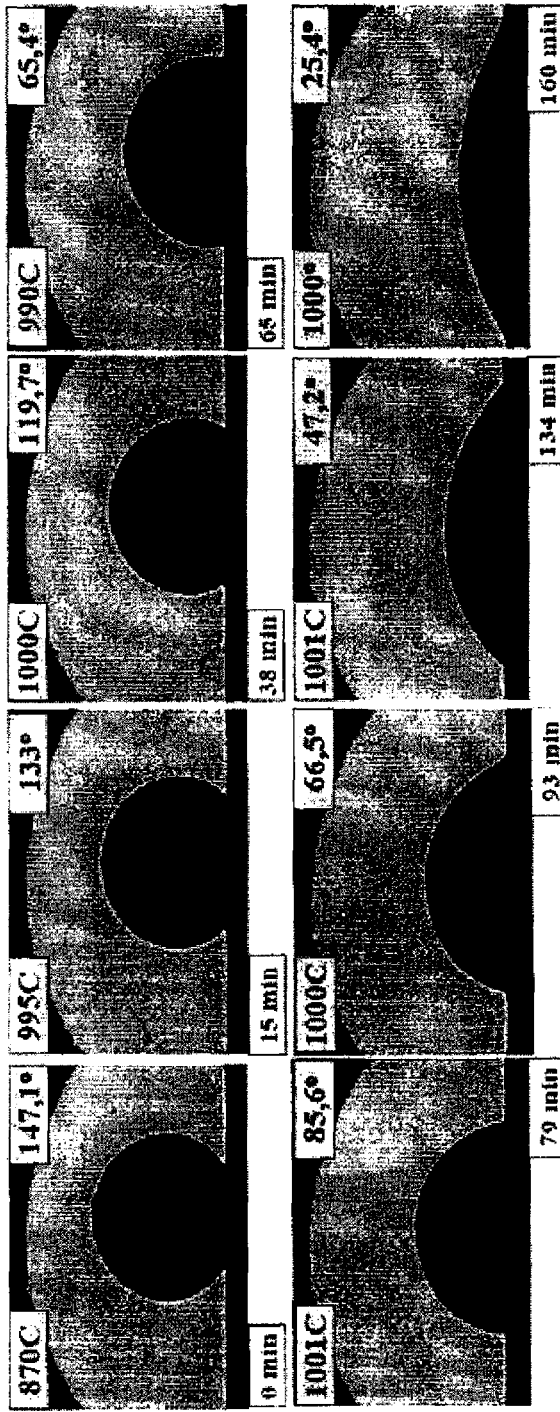
FIGS. 3a-3c present, at a temperature of approximately 1000° C., the wettability as a function of time of a drop of liquid aluminum of 90 mg on $Al_3Ta$, $Al_4W$ and $Al_8Mo_3$, respectively.
Figure 3B:
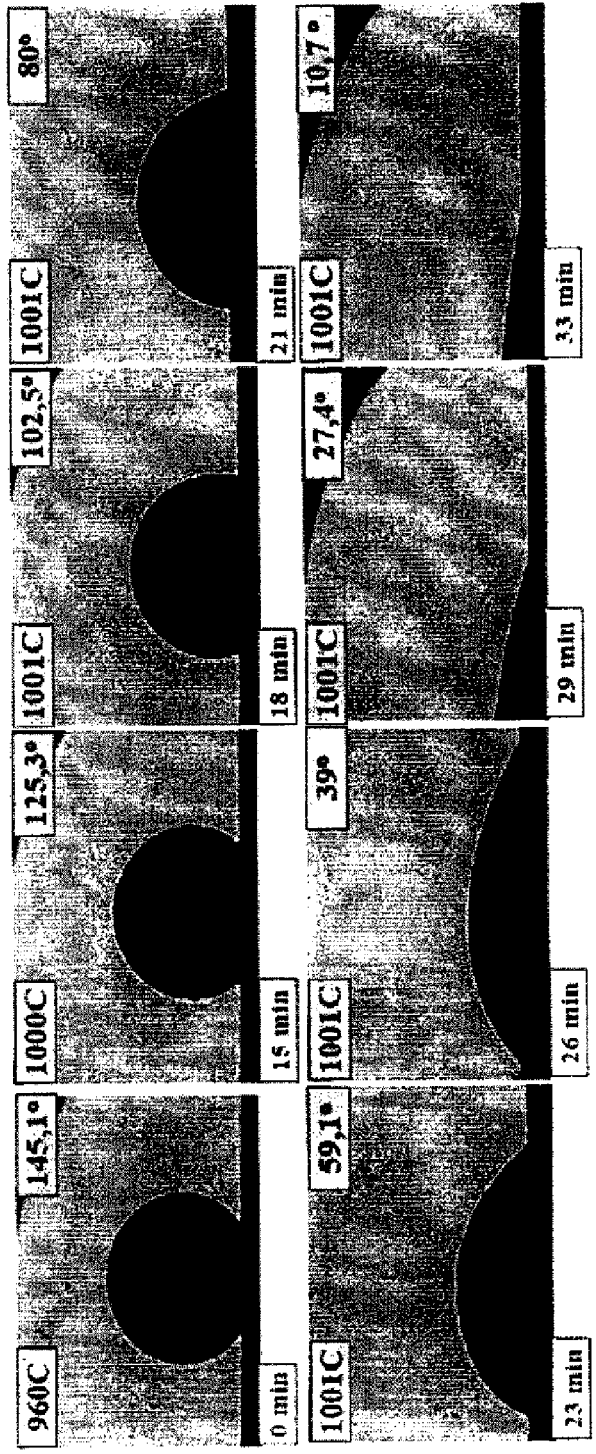
Figure 3C:
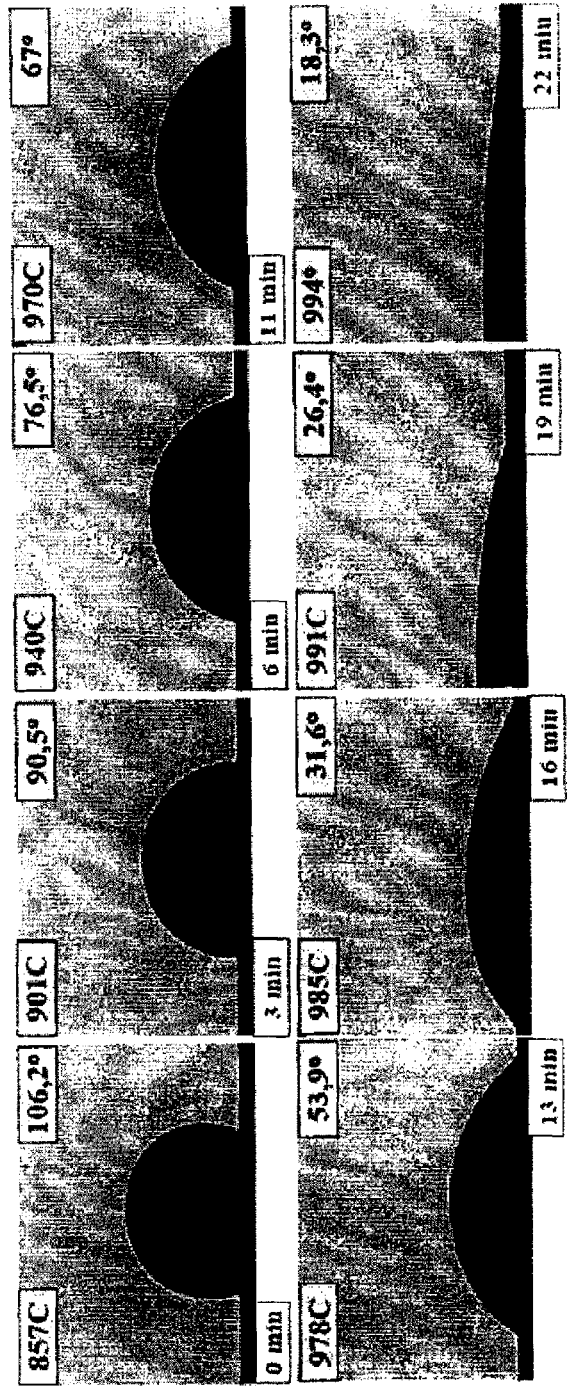

FIGS. 3a, 3b and 3c represent experiments of wettability of liquid aluminum on surfaces of refractory metal aluminides (Al-MR). FIG. 3a is the case of $Al_3Ta$, FIG. 3b the case of $Al_4W$, and FIG. 3c that of $Al_8Mo_3$. In contrast to the above, it takes only approximately ten minutes, or at most approximately one hundred minutes, to obtain a contact angle of several tens of degrees. The speed of wettability on a refractory metal aluminide is thus greater by one order of magnitude than that on the corresponding refractory ceramic.

Figure 4A:
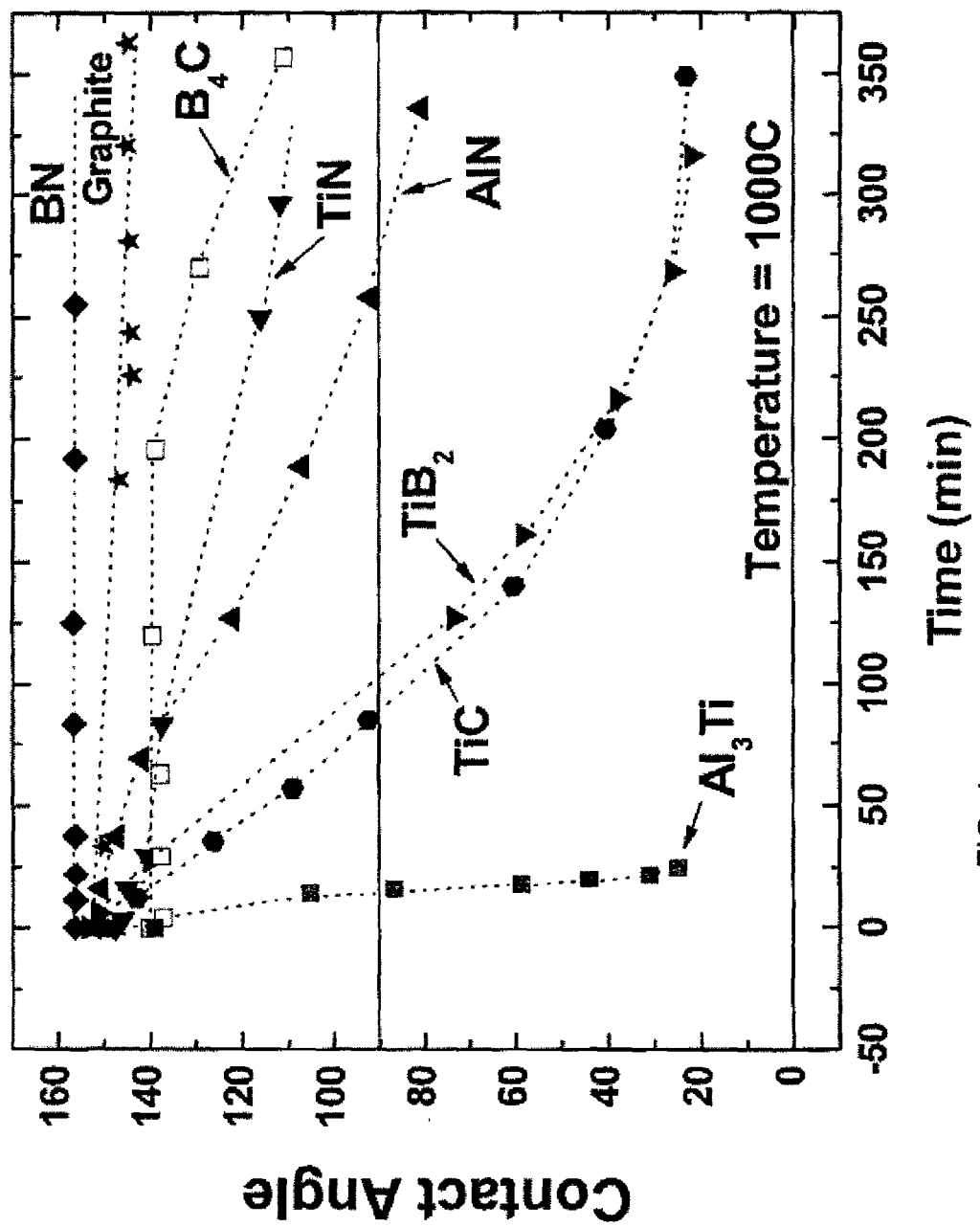
FIG. 4a presents, as a function of time, the mean contact angle between a drop of liquid aluminum of 90 mg and various refractory ceramics. The curves corresponding to titanium aluminide ($Al_3Ti$) and to graphite are also presented for comparison purposes.

FIG. 4a shows the variation over time of the contact angle of the liquid aluminum on various refractory ceramics (C—N—B-MR) at 1000° C. As mentioned above, graphite is not wetted by liquid aluminum, and this is also the case for boron nitride (BN). The contact angle for these materials is very high and practically, does not vary overtime. The nitrides of aluminium (AlN) or titanium (TiN) are wetted very little by aluminum. The corresponding contact angles are, for the most part, greater than 90°. Moreover, the refractory materials that are known to be good grain refiners (TiC and $TiB_2$) are wetted well by liquid aluminum. The contact angles become smaller than 90° after approximately 100 min. FIG. 4a also shows the case of titanium aluminide ($Al_3Ti$) to compare it with the refractory ceramics. The speed of wettability on $Al_3Ti$ is extremely rapid compared to the others. This observation corroborates the above-discussed hypothesis of the existence of a fine layer of $Al_3Ti$ on the surface of $TiB_2$ to ensure the wettability of this grain refiner.

Figure 4B:
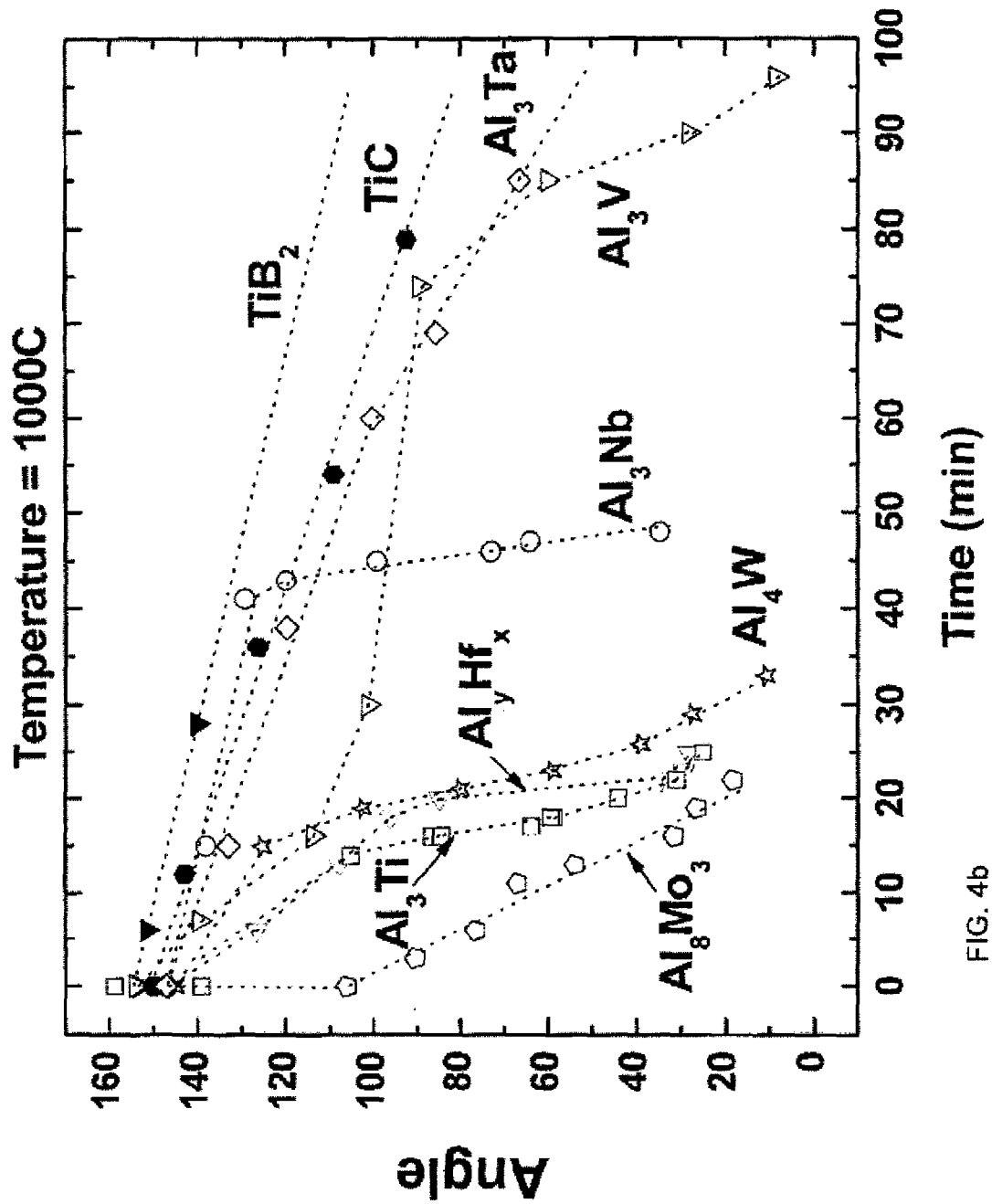
FIG. 4b presents, as a function of time, the mean contact angle between a drop of liquid aluminum of 90 mg and various refractory metal aluminides. The curves corresponding to $TiB_2$ and TiC are also presented for comparison purposes.

FIG. 4b shows the contact angle as a function of time for the aluminides of the refractory metals (Al-MR). The time scale is on the order of several tens of minutes, which is much shorter than that of the previous figure. The wettability is fastest on aluminides of Mo, Ti, Hf and W followed by Nb, V, and finally Ta. The same figure shows, for comparison, the result of the wettability experiments on TiC and $TiB_2$.

The previous results clearly show the advantage of combining these two types of materials within a composite to ensure, on the one hand, the wettability via the component (Al-MR), and, on the other hand, to ensure the stability, the resistance to wear, and the durability via the component (C—N—B-MR). In addition, these two components can coexist in thermodynamic equilibrium at the operating temperatures of the electrolysis cells (~960° C.) as indicated in FIGS. 1a)-d) (two-phase space in the triangle surrounded by dotted lines).

Figure 5:
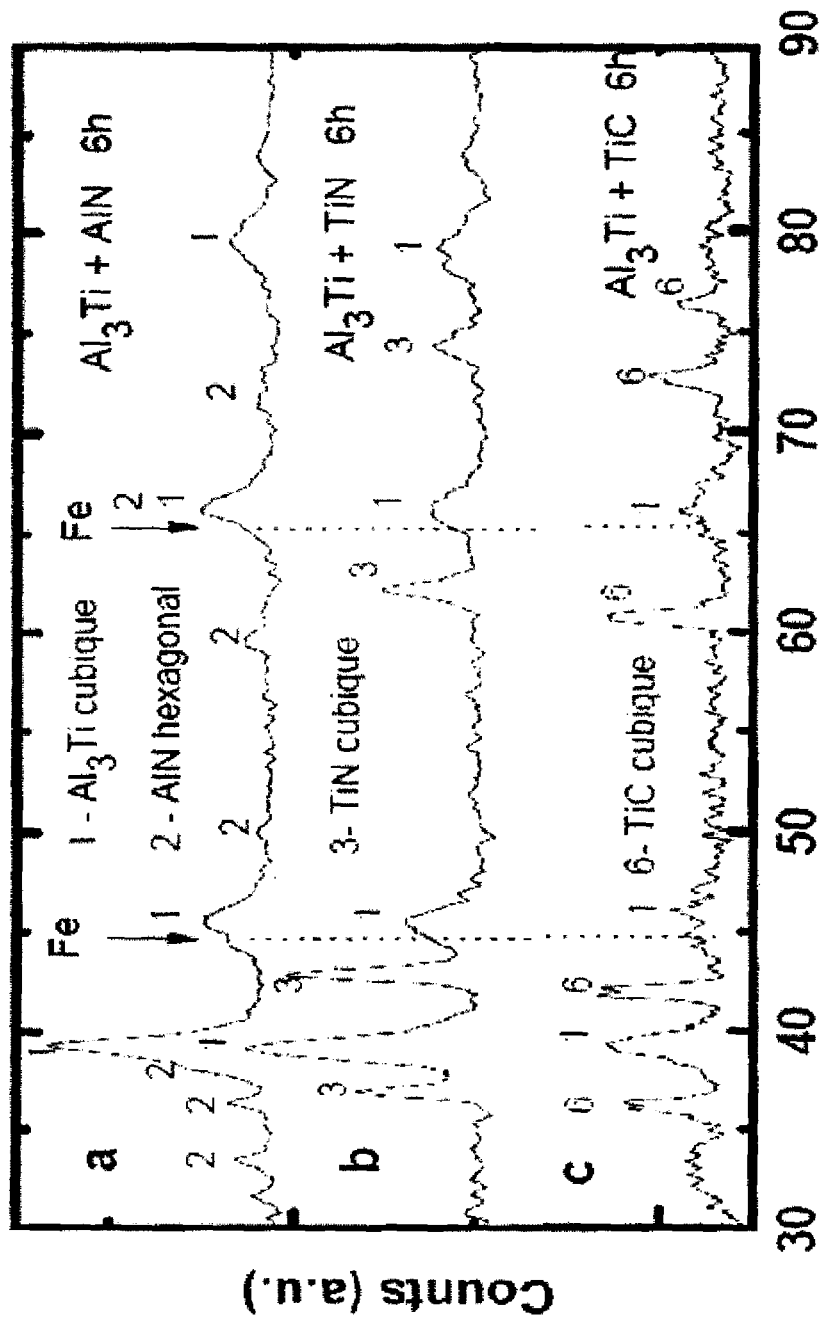
FIG. 5 presents X-ray diffraction spectra of composites according to the invention comprising titanium aluminide ($Al_3Ti$) and various refractory ceramics.

FIG. 5 presents X-ray diffraction spectra of nanocrystalline composites $(C—N—B-MR)_x(Al-MR)_y$, obtained by intense mechanical milling. The component of aluminide (Al-Mr) is $Al_3Ti$, and the refractory ceramic is 5a) AlN, 5b) TiN, and 5c) TiC, respectively.

The addition of a component (Al-MR) to that of the refractory ceramic provides an additional advantage, that of shaping and compaction of the composite materials. Indeed, as shown in the table of FIG. 6, the refractory ceramics (C—N—B-MR) have very high melting points, typically 2000-4000° C. Thus, temperatures (and often pressures that are very high) are required to consolidate them at high density by sintering, or to shape them as a coating. Among the thermal spray techniques, only the plasma techniques (APS, VPS "air and vacuum plasma spray") can be considered, as mentioned above.

Figure 7A:
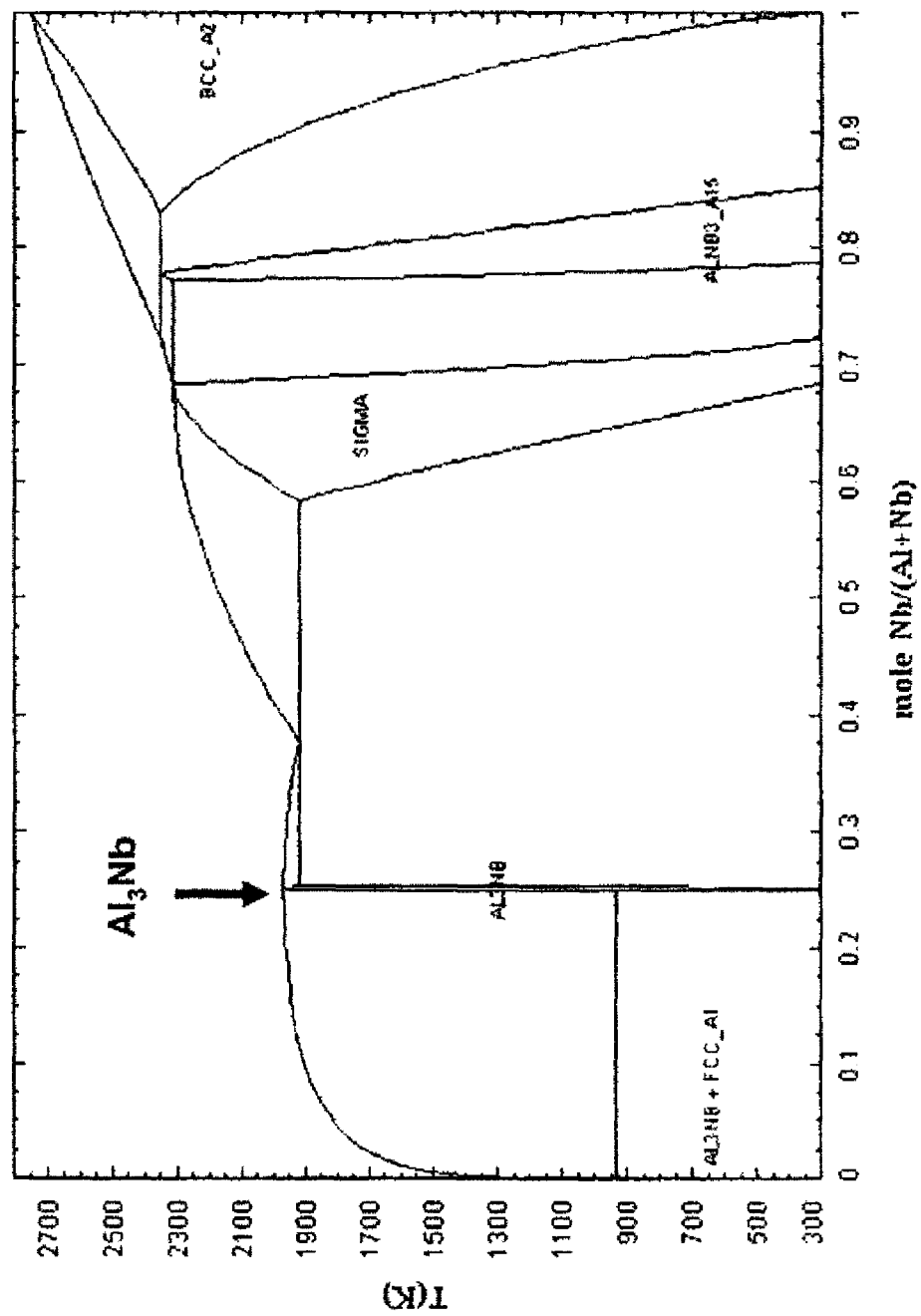
FIGS. 7a and 7b present the phase diagrams of the systems Al—Nb and Al—Ta, respectively.
Figure 7B:
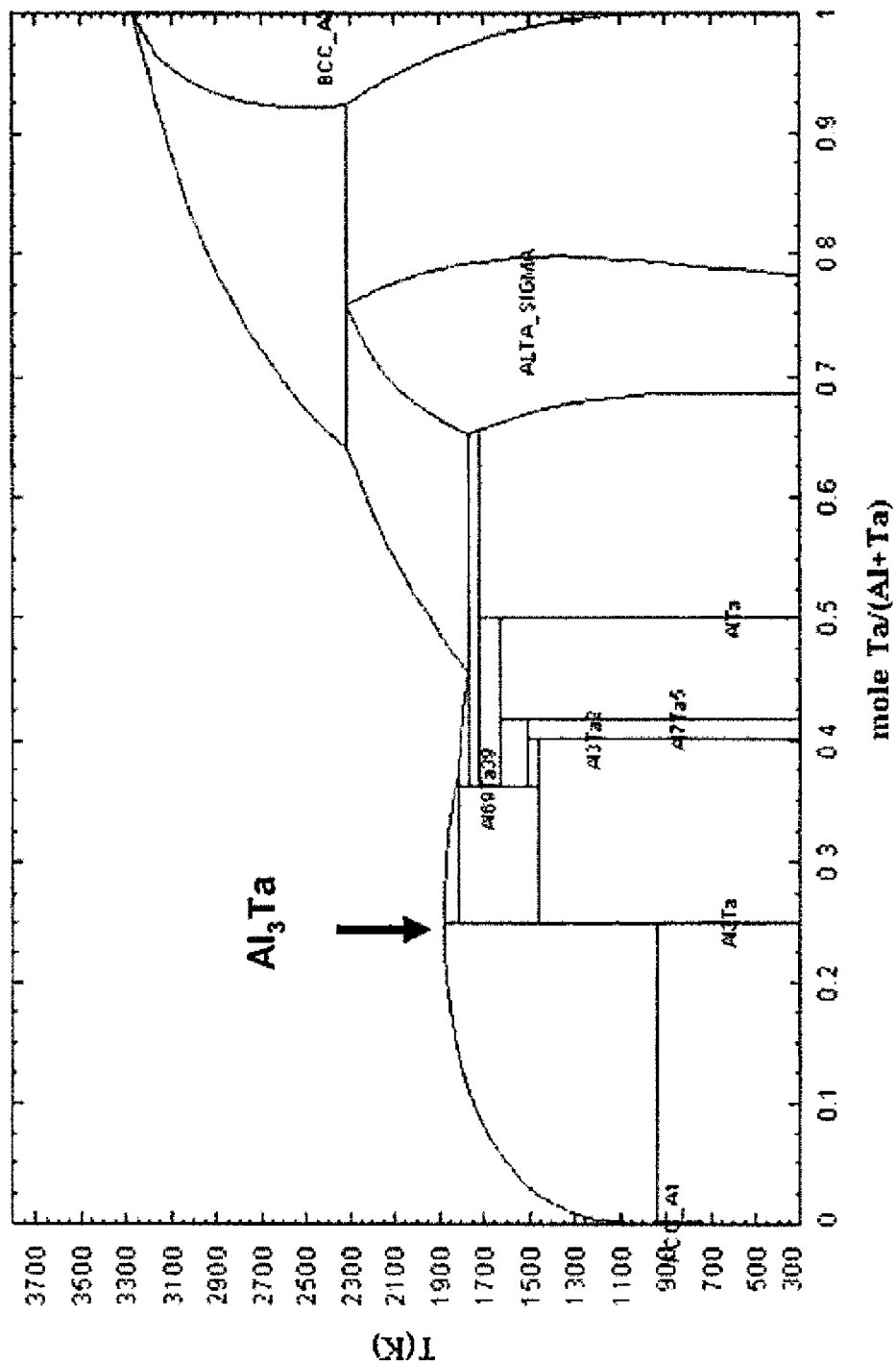

Unfortunately, these techniques often produce very porous materials. In contrast, the aluminides of the refractory metals, that is, the components (Al-MR), have much lower melting points, under 1800° C., and typically between 1300 and 1700° C. (see the table of FIG. 6). This temperature range is ideal for thermal spray by HVOF ("high velocity oxyfuel") which gives rise to very dense coatings. Moreover, the sintering of the composite $(C—N—B-MR)_x(Al-MR)_y$ containing a component of refractory metal aluminide with low melting point could also be carried out at much lower temperatures, which are much easier to generate in industry. In addition, the aluminides of refractory metals of the type considered in the present invention often have congruent melting points, as shown in FIGS. 7a and 7b for $Al_3Nb$ and $Al_3Ta$, respectively. This allows the solidification, directly from the liquid state, of the material having the proper composition (Al-MR), without any chemical segregation.

Figure 8:
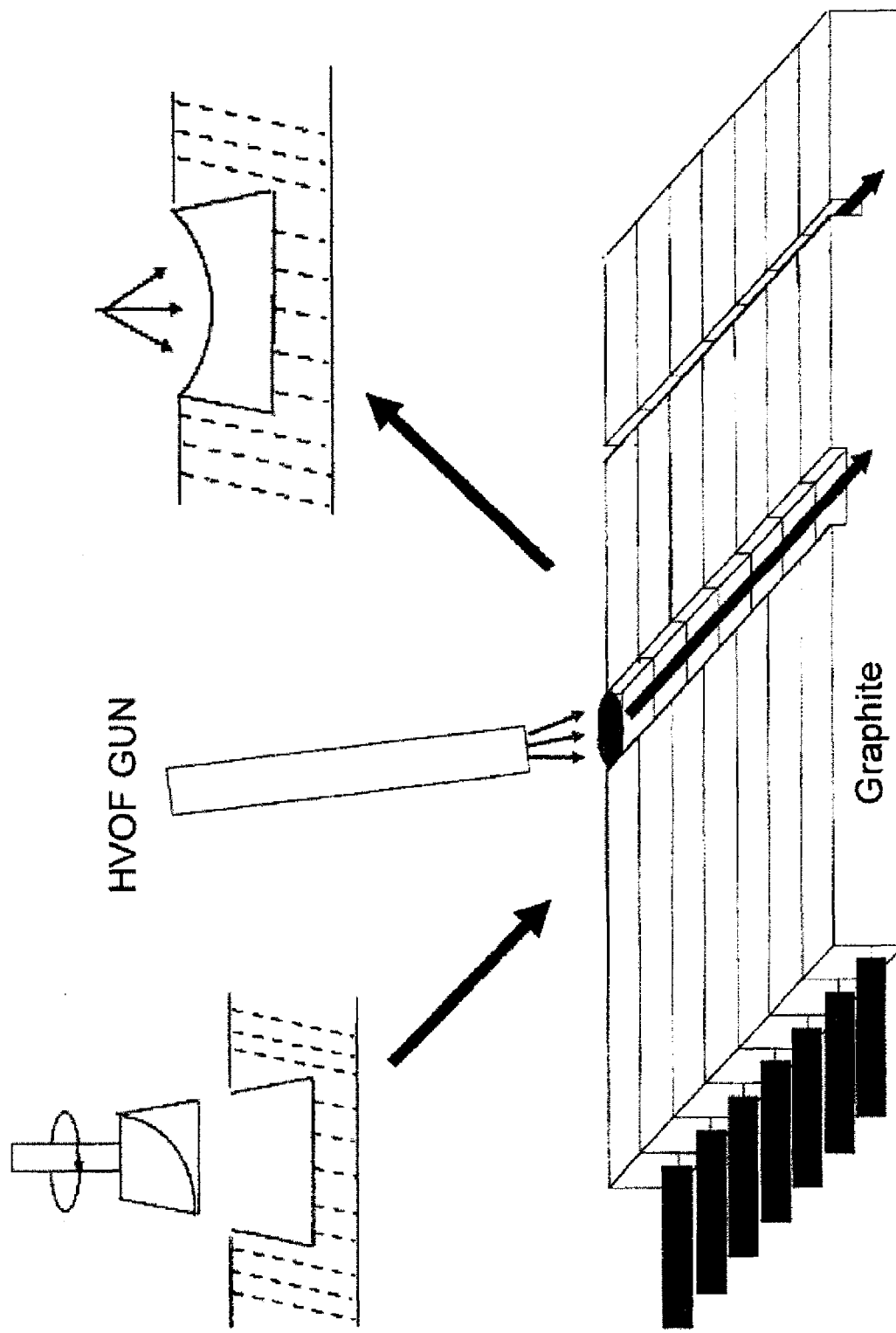
FIG. 8 presents a schematic view of a method for manufacturing a coating of composite materials according to the invention, which involves the use of thermal deposition by HVOF.

FIG. 8 shows a schematic view of a nonlimiting example of application in the form of a coating of the material according to the invention by means of the HVOF technique. First, a groove is engraved with a grinding wheel on the surface of a solid body, which can be a series of mutually juxtaposed graphite cathodes. The depth of the groove can typically vary between several tens of microns and several centimeters. Using the HVOF technique, the composite of the invention is deposited inside the groove in such a way as to produce a channel which is wettable by liquid aluminum. The groove thus allows channeling the liquid aluminum towards the recovery basin, in addition to creating an obstacle to the displacements of the aluminum, which are generated by Lorentz forces, as discussed above. By limiting the coating to the grooves, rather than coating the totality of the surface area of the cathodes, the costs are reduced accordingly.

The invention claimed is:

1. A composite material of formula

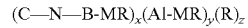

in which:
Al, C, N and B represent aluminum, carbon, nitrogen, and boron, respectively;
MR is one or more refractory metals of the series IV, V or VI of the periodic table;
C—N—B-MR is one or more carbides, nitrides or borides of the above-mentioned refractory metal(s);
Al-MR is one or more aluminides of the refractory metal(s) mentioned above, it being understood that:
if MR=Nb, Ta, Hf, Zr, Ti, V then Al-MR=$Al_3MR$;
if MR=W, Cr then Al-MR=$Al_4MR$;
if MR=Mo, then Al-MR=$Al_8Mo_3$ or $Al_{17}Mo_4$ (~$Al_4Mo$)
R is a residual component other than carbon comprising one or more phases from $Al_4C_3$, AlN, $AlB_2$, $Al_{1-67}B_{22}$ and $MR_tAl_u(C—N—B)_v$ where t, u and v are numbers greater than or equal to zero, and
x, y, z are the volume fractions of the respective components with
x>y; x+y>0.5; x+y+z=1 and 0.01<y<0.5,
with the reservation that, when C—N—B-MR is $TiB_2$, then Al-MR is not $Al_3Ti$.

2. A composite material according to claim 1, in which MR is chosen from Nb, Ta, W, Mo, Hf, Zr, Cr, V and Ti.

3. A composite material according to claim 1, in which MR is chosen from Nb, Ta and W.

4. A composite material according to claim 1, in which MR is Ti.

5. A composite material according to claim 1, in which the material is nanocrystalline.

6. A method for the manufacture of a coating of a composite material according to claim 1, which consists in consolidating the material on a partial melting on a substrate or by sintering of the material at a temperature of less than 1800° C.

7. A method for the manufacture of a coating of a composite material according to claim 1, which consists of projecting at high speed fine particles of the composite material on a substrate using the thermal projection technique HVOF.

8. A component that is wettable by liquid aluminum, which consists of a solid body on which a coating of a composite material according to claim 1 is applied.

9. A component according to claim 8, in which the coating is manufactured with the help of the method of claim 6.

10. A component according to claim 8, in which the coating is applied only in grooves engraved on the surface of the solid body.

11. A component according to claim 8, in which the coating is manufactured with the help of the method of claim 7.

12. A component according to claim 11, in which the coating is applied only in grooves engraved on the surface of the solid body.

13. A component according to claim 8, which is part of an electrolysis cell for aluminum production.

14. A component according to claim 8, which is part of a wettable cathode for aluminum production.

* * * * *